Figure 1:
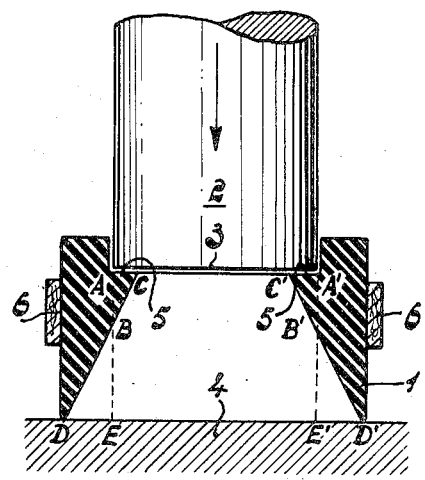

April 1, 1958     W. P. VAN DEN BLINK     2,829,234

SLAGFORMING BODY FOR USE IN BUTT-WELDING

Filed July 22, 1954

INVENTOR
WILLEM PIETER VAN
DEN BLINK
BY
       AGENT

United States Patent Office 2,829,234
Patented Apr. 1, 1958

2,829,234

SLAGFORMING BODY FOR USE IN BUTT-WELDING

Willem Pieter van den Blink, Utrecht, Netherlands, assignor, by mesne assignments, to North American Philips Company, Inc., New York, N. Y., a corporation of Delaware Application July 22, 1954, Serial No. 445,104

Claims priority, application Netherlands August 21, 1953

1 Claim. (Cl. 219—99)

This invention relates to slagforming solid bodies for use in butt-welding, which is to be understood in this case to mean the butt-welding of a pin-shaped metallic object such as a bolt on a metallic surface by maintaining an arc flame for a certain period between the parts to be joined and subsequently bringing the two parts in contact with one another.

It is known in this method to utilise a slagforming body which is placed between the parts to be joined, thus maintaining the parts spaced through a distance corresponding to the desired length of the arc flame, and which does not permit the two parts to be brought in contact with one another until the body has been deformed by the action of the heat of the arc. By suitable choice of the composition and the size of the slagforming body it may be ensured that the welding process proceeds automatically when pressure is exerted upon one of the parts to be joined, since the period of time required to deform the slagforming body due to action of the heat of the arc exactly corresponds to the desired burning period of the arc flame. In order to obtain this accuracy in a reproducible manner, it has previously been suggested that the body should be given a shape and a size such that it is only after a predetermined part of the body has been softened by the arc flame, that the body no longer resists to a pressure exerted on it. Such a slagforming body exhibits, for example, a continuous cavity of a shape such that the extremity of a pin introduced into it can penetrate it only through a determined length, the extremity of the pin being pushed against the surface only after the part of the body between the supporting surface for the pin and the surface to which the pin is to be secured has been softened (see Dutch patent specification No. 70,858). It has been found that this method frequently yields a weld in which slag is occluded and which is irregular in shape.

The slagforming body according to the invention which permits of mitigating the said disadvantages likewise exhibits a cavity of a shape such that the pin can penetrate it through a determined length and is characterised by an opposing cavity having an aperture larger than the cross-section of the pin and a volume larger than the volume of the pin which penetrates the body after local softening thereof. The softened part is accommodated in such a slagforming body when the extremity of the pin penetrates the body. In the absence thereof the slag must find a way out either through an aperture between the body and the surface to which the pin is to be secured or through cracks in the body, which frequently results in deformation of the welding area, while there is a possibility of slag remaining in the welded metal.

It has furthermore been found that the heat of the arc flame frequently causes cracking of the body, in many cases followed by crumbling-off and deformation as a result of mechanical stress produced therein, resulting in variation of the dimensions of the part of the body which is to be softened by the heat of the arc flame and hence variation of the period during which the body is resistant to the pressure exerted on it.

In one preferred embodiment of the invention, the said disadvantage is mitigated by the use of a slagforming body which is strengthened in such a manner that, even after cracking of the body, the coherence of the body is ensured during the burning of the arc flame to a sufficient extent until a predetermined part thereof has been softened.

The body may be strengthened by armouring it with one or more metal wires.

However, a wire or strip is preferably attached to the outer surface of the body, since this may be effected in a simple manner. Although a wire or a strip of iron proves satisfactory, it has been found that a paper or cardboard strip glued to the body is cheaper and also resistant to heating for a period sufficiently long to avoid any premature disintegration of the body.

In another preferred embodiment of the invention, use is made of a strengthening strip, of which part of its width supports the body and another part of its width constitutes the cavity which the extremity of the pin can penetrate and in which it is secured in a clamping manner, for example due to the edge of the cavity being bent over. The handling of such bodies is thus simplified.

In order that the invention may be readily carried into effect, it will now be described with reference to the accompanying drawing, given by way of example, in which:

Fig. 1 is a sectional view on an enlarged scale of a body according to the invention.

The said body or ferrule is indicated by 1 and an iron bolt which is to be secured, at its extremity 3, to an iron plate 4 is indicated by 2. The bolt is pushed in the direction of the arrow against a ring 5, so that the burning time of the arc flame is adjusted to the time required to soften the annular part ABCA'B'C'. A strengthening strip is indicated by 6.

The volume of the cavity of which the cross-section is bounded by the line CBDD'B'C' is larger than the volume of the space of which the cross-section is bounded by ABEE'B'A', so that the mass of the annular part ABCA'B'C' may be taken up in the annular volume BDEB'D'E' after the extremity 3 of the pin has been brought in contact with surface 4. Furthermore, the aperture DD' of the cavity is larger than the cross-section EE' of the pin.

Figure 2:
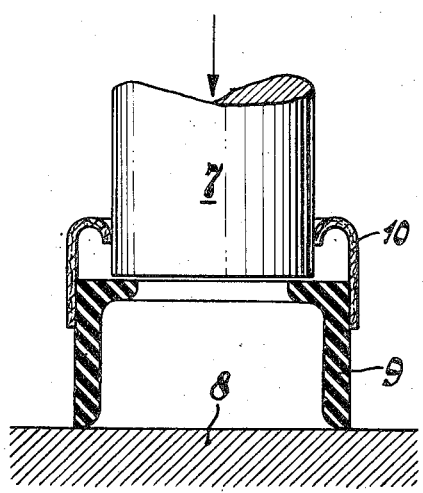

Fig. 2 shows a further embodiment of the invention in which 7 indicates the bolt and 8 indicates the surface to which the extremity 3 is to be secured. The body according to the invention, which is indicated by 9, comprises a strip 10, of which the lower part prevents deformation of the body as a result of cracking, while its upper part connects the body 9 to the bolt 7 in a clamping manner and is bent over for this purpose.

What is claimed is:

A slag-forming ferrule for use in butt welding a metallic pin to a metallic surface, said slag-forming ferrule provided with an opening having a portion of less diameter than the diameter of said metallic pin and forming an annular shelf, and at least another portion of said opening having a greater diameter than the diameter of said pin whereby upon local softening of said annular shelf said pin penetrates completely through said opening and into engagement with said metallic surface, a strengthening strip secured to the outer surface of said ferrule and having part thereof projecting above the plane of the top surface of said ferrule and defining an aperture, said strip clamping an end of said metallic pin in said aperture thereby ensuring the coherence of said ferrule during the burning of the arc flame until said annular shelf has been locally softened.

References Cited in the file of this patent

UNITED STATES PATENTS

| | | |
|---|---|---|
| Re. 22,108 | Crecca | June 9, 1942 |
| 2,416,204 | Nelson | Feb. 18, 1947 |
| 2,459,957 | Palmer | Jan. 25, 1949 |
| 2,493,283 | Evans | Jan. 3, 1950 |
| 2,509,999 | Van Der Willigen | May 30, 1950 |
| 2,510,000 | Van Der Willigen | May 30, 1950 |

FOREIGN PATENTS

| | | |
|---|---|---|
| 649,177 | Great Britain | Jan. 17, 1951 |